United States Patent [19]

Harper

[11] E Patent Number: Re. 31,690

[45] Reissued Date of Patent: Oct. 2, 1984

[54] SNAP ACTION CIRCUIT BREAKER

[75] Inventor: George S. Harper, Cambridge, Md.

[73] Assignee: No. American Philips Corp., Cambridge, Md.

[21] Appl. No.: 187,996

[22] Filed: Sep. 17, 1980

Related U.S. Patent Documents

Reissue of:

[64] Patent No.: 4,117,285
Issued: Sep. 26, 1978
Appl. No.: 826,060
Filed: Aug. 19, 1977

[51] Int. Cl.[3] ..... H01H 5/00; H01H 9/02

[52] U.S. Cl. ..... 200/76; 200/293; 335/63; 335/188; 335/191; 335/202

[58] Field of Search ..... 200/76–78, 200/293; 335/16, 63, 64, 174, 188, 191, 202

[56] References Cited

U.S. PATENT DOCUMENTS

| | | | |
|---|---|---|---|
| 3,497,838 | 2/1970 | Merriken et al. | 335/64 |
| 3,626,338 | 12/1971 | Nicol et al. | 335/202 |
| 3,749,873 | 7/1973 | Harper et al. | 335/202 X |
| 3,806,848 | 4/1974 | Harper et al. | 335/188 |
| 4,062,052 | 12/1977 | Harper et al. | 335/63 X |

FOREIGN PATENT DOCUMENTS

| | | | |
|---|---|---|---|
| 1146606 | 5/1957 | France | 200/76 |
| 1072558 | 6/1967 | United Kingdom | 200/76 |

*Primary Examiner*—Robert S. Ward, Jr.
*Attorney, Agent, or Firm*—Saidman, Sterne & Kessler

[57] ABSTRACT

Disclosed is a snap action circuit breaker with a compact one piece steel frame in a two part, telescoping molded circuit breaker case. The compact construction is combined with a symmetrical toggle actuator to provide a pleasing appearance suitable for mounting at readily accessible and visible locations on the front of an instrument panel. A variety of handle constructions are usable with the same basic mechanism. By providing a snap actuated contact construction with substantial overcurrent trip delay the device combines the best features of modern manual switches and circuit breakers so that it is in effect a manual switch with nuisance free over-current trip protection.

43 Claims, 50 Drawing Figures

FIG. 10
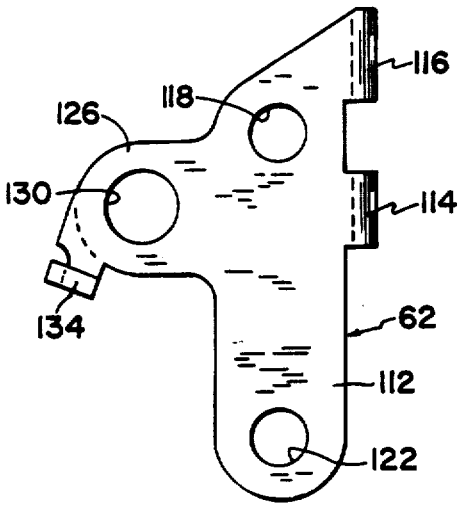
FIG. 11
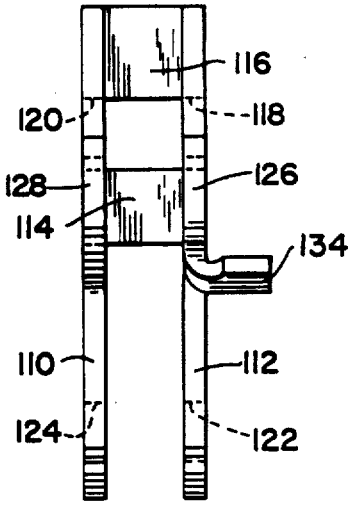
FIG. 12
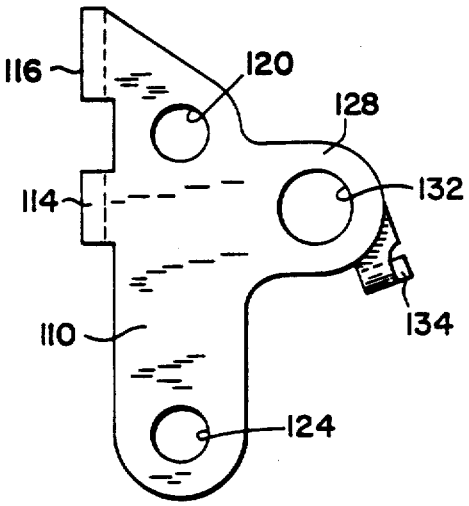
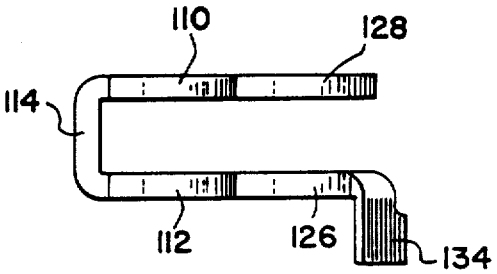
FIG. 13

FIG. 14
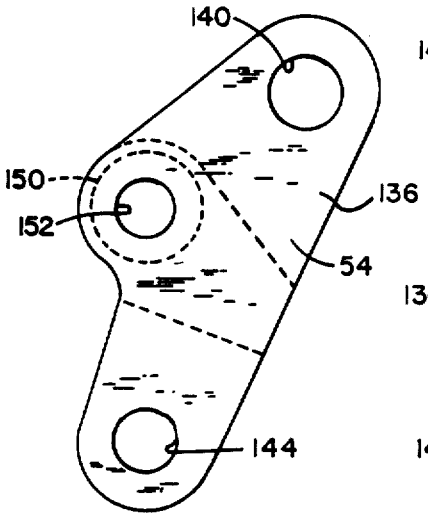
FIG. 15
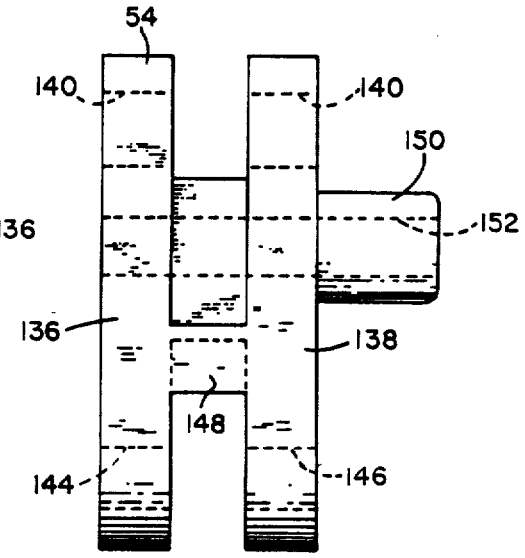
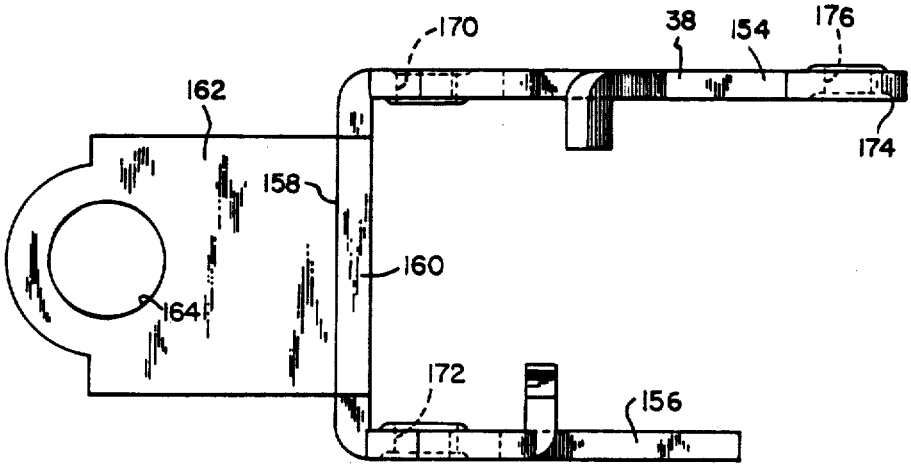
FIG. 18

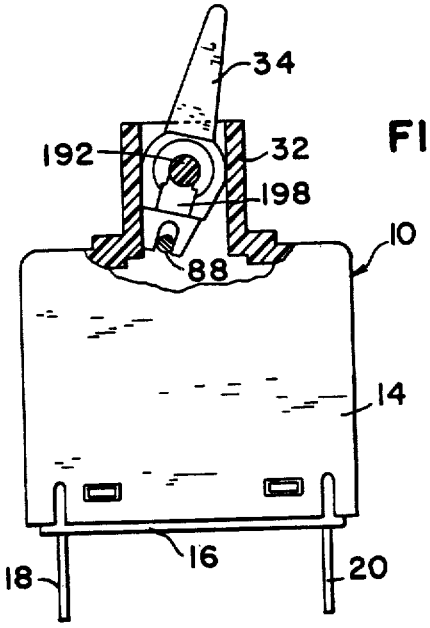
FIG. 23
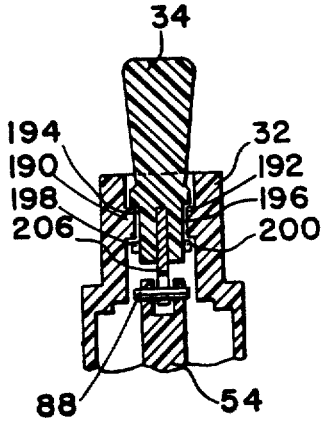
FIG. 24
FIG. 25
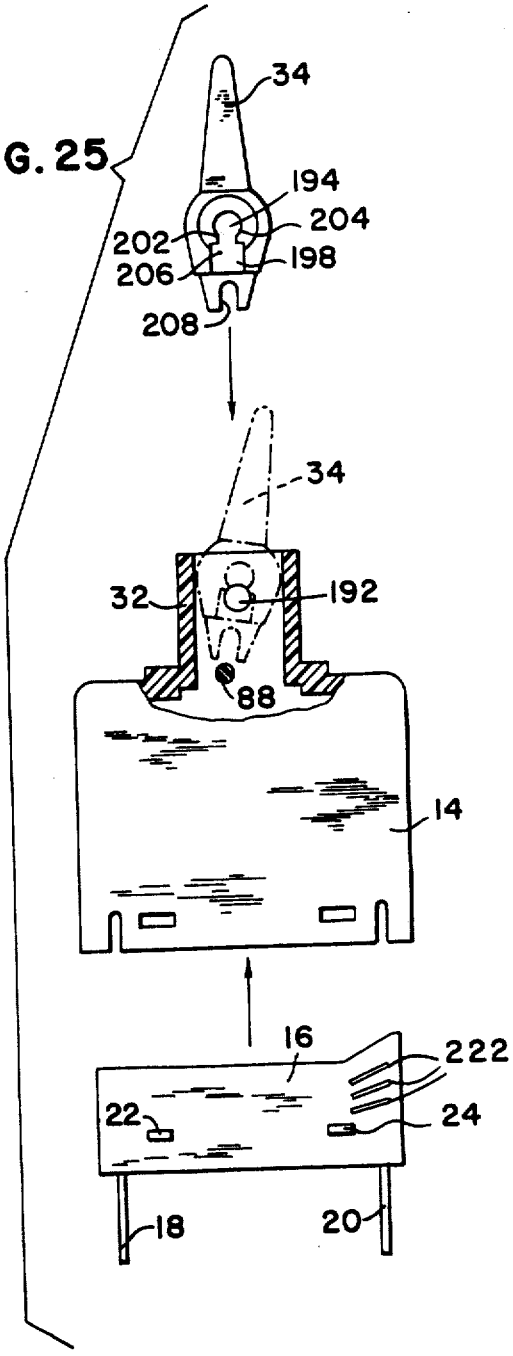

FIG. 26
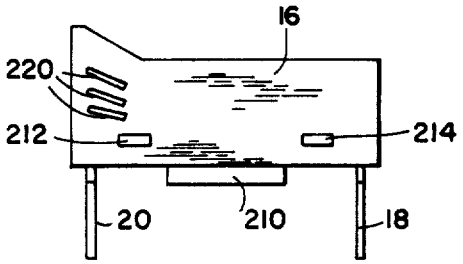
FIG. 27
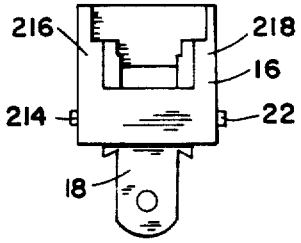
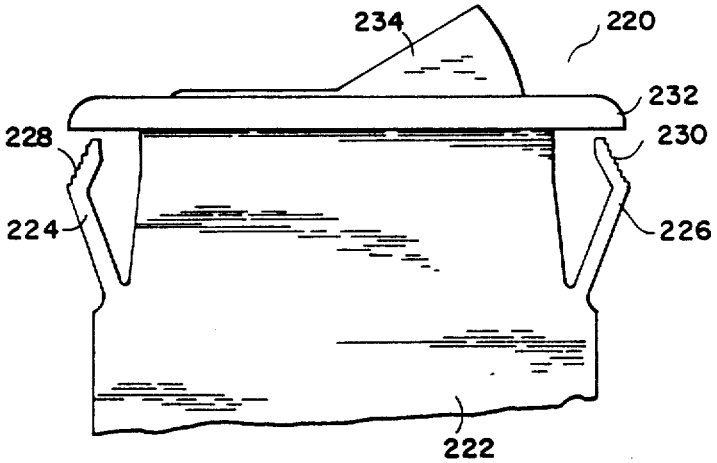
FIG. 28

SNAP ACTION CIRCUIT BREAKER

Matter enclosed in heavy brackets [ ] appears in the original patent but forms no part of this reissue specification; matter printed in italics indicates the additions made by reissue.

This invention relates to an electrical circuit breaker in which the contacts open during overload with a snap action and when manually operated by the circuit breaker handle are both opened and closed with a snap action. More particularly, the invention is directed to a simpified more compact and improved circuit breaker of this type incorporating an overload current coil and armature tripping mechanism.

A snap action circuit breaker is disclosed in assignee's U.S. Pat. No. 3,806,848. In this device a toggle mechanism is tripped by the attraction of an armature to an electromagnet when the current through the electromagnet coil exceeds a predetermined value. Coupled to the movable contact of the circuit breaker is an over center spring so that upon tripping, the contacts open with a positive snap action to minimize contact arcing.

The over center spring also acts on the movable contact when the contacts of the circuit breaker are opened or closed by way of the toggle handle. This snap action opening and closing of the circuit breaker contacts during manual operation has the advantage that it makes it impossible for anyone to "tease" the contacts in such a way as to damage the circuit breaker.

The present invention is directed to a snap action circuit breaker of this general type but one which is of simplified, more compact construction, is more attractive in appearance, and one which may be utilized with a variety of different handle constructions. The circuit breaker of the present invention is particularly constructed to be small and more pleasing in appearance so that it may be used in more visible locations such as on instrument panels and the like, and since it opens and closes during manual operation with a snap action, it may be manually operated much in the manner of a conventional electrical switch. It is designed to combine aspects of conventional electrical switch operation with electromagnetic type of current protection.

This is brought about by utilizing a novel, one piece frame construction for the operating mechanism in combination with a single basic symmetrical case and linkage assembly compatible with a variety of operating handles. The symmetrical construction provides a pleasing appearance as does the availability of various operating handles. Additionally, different handle constructions may give different manual motions to the linkage mechanism such as conventional two position on-off or a push to open, push to close button actuated operation.

It is therefore, one object of the present invention to provide an improved snap action circuit breaker.

Another object of the present invention is to provide a more compact snap action circuit breaker construction which can be made in smaller sizes.

Another object of the present invention is to provide a snap action circuit breaker having a symmetrical and more pleasing appearance for the visible locations such as on an instrument panel, or the like.

Another object of the present invention is to provide a circuit breaker construction in which the basic elements are adapted to cooperate with a variety of handles for manually operating the circuit breaker contacts.

Another object of the present invention is to provide a molded case type circuit breaker having a unitary single element frame construction.

These and further objects and advantages of the invention will be more apparent upon reference to the following specification, claims and appended drawings wherein FIG. 1 is a side elevation of a circuit breaker constructed in accordance with the present invention and incorporating a toggle type handle.

FIG. 10 is a side view of the housing link forming the other collapsible link of the mechanism of FIG. 7.

FIG. 11 is a side view of the housing link of FIG. 10.

FIG. 12 is a view of the housing link taken from the side opposite to that of FIG. 10.

FIG. 13 is a top edge view of the housing link of FIGS. 10 through 12.

FIG. 14 is a side view of the handle link forming a part of the mechanism of FIGS. 2 through 5.

FIG. 15 is an end view of the handle link of FIG. 14.

FIG. 18 is a top edge view of the frame.

FIG. 23 is a front view with a portion in section of the circuit breaker of FIG. 1 showing the manual toggle construction.

FIG. 24 is a partial cross section at right angles to the view of FIG. 23, again showing the toggle handle operating mechanism.

FIG. 25 is an exploded view of the toggle handle embodiment of the present invention illustrating how some of the parts fit together.

FIG. 26 is a front elevation of the lower portion of the circuit breaker case incorporating the circuit breaker terminal.

FIG. 27 is an end view of the lower case section of FIG. 26.

FIG. 28 is a partial front elevation of a modified circuit breaker case constructed in accordance with the present invention and incorporating a rocker type handle.

Figure 1:
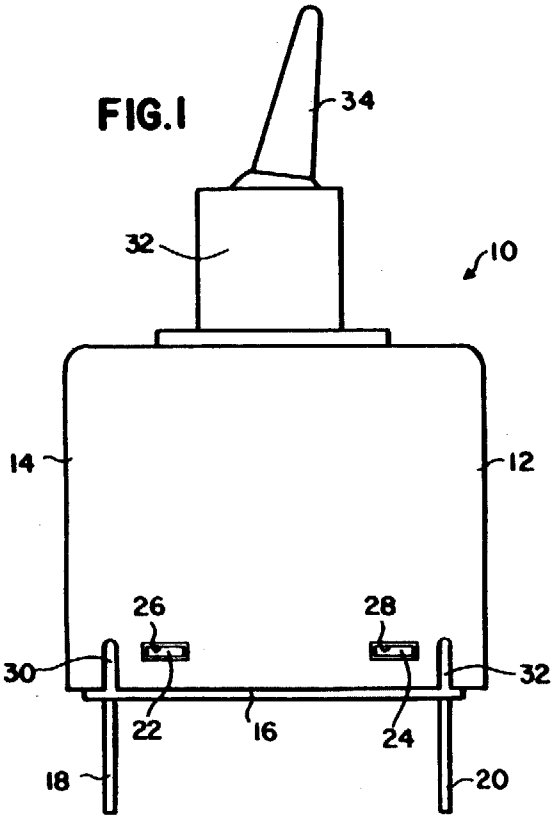

Referring to the drawings, the novel circuit breaker of the present invention is generally indicated at 10 in FIG. 1. The circuit breaker comprises a case 12 of molded electrically insulated plastic which is formed of an upper or outer case section 14 which is open at its lower end to receive a lower portion or lower case section 16. Lower section 16 carries a pair of electrically conductive terminals 18 and 20 and has two projections on each side, such as the projections 22 and 24, which are received in corresponding slots 26 and 28 in upper casing section 14. The upper section has two grooves on each side such as the grooves 30 and 32 to impart more flexibility to the upper section so that the lower section may be slipped into it until the projections 22 and 24 snap into the slots 26 and 28. Upper case section 14 includes a boss 32 from which extends a toggle type circuit breaker handle 34.

Figure 2:
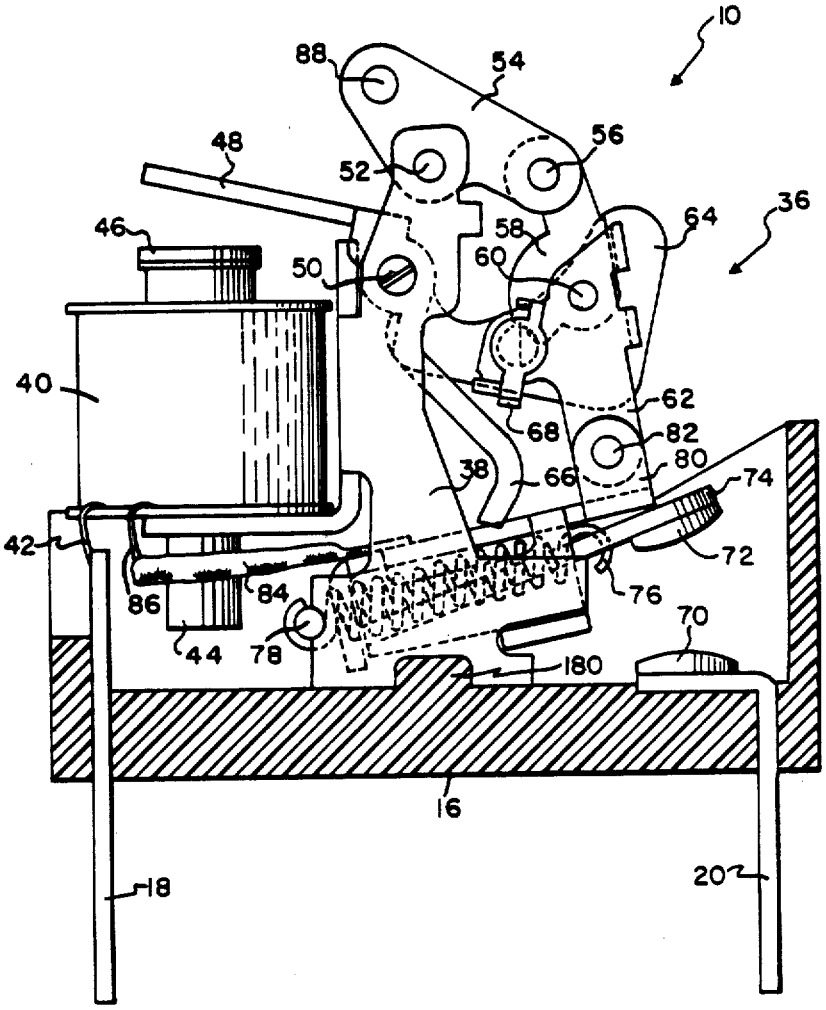
FIG. 2 is a view showing principal portions of the internal operating mechanism of the circuit breaker of FIG. 1 with the contacts in the manual open position.
Figure 3:
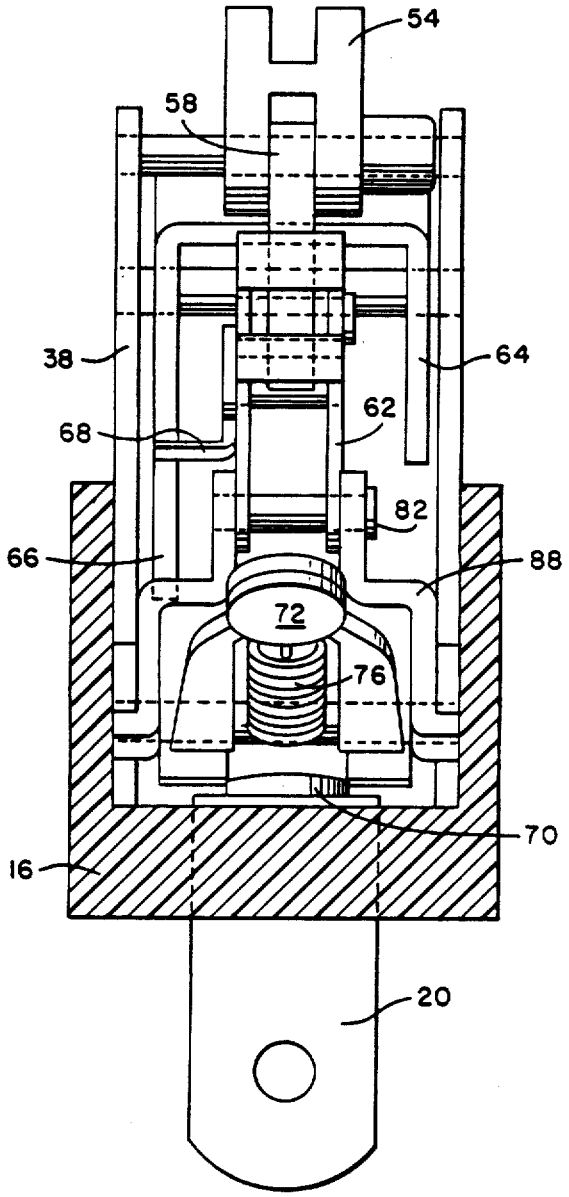
FIG. 3 is an end view showing the structure of FIG. 2.
Figure 4:
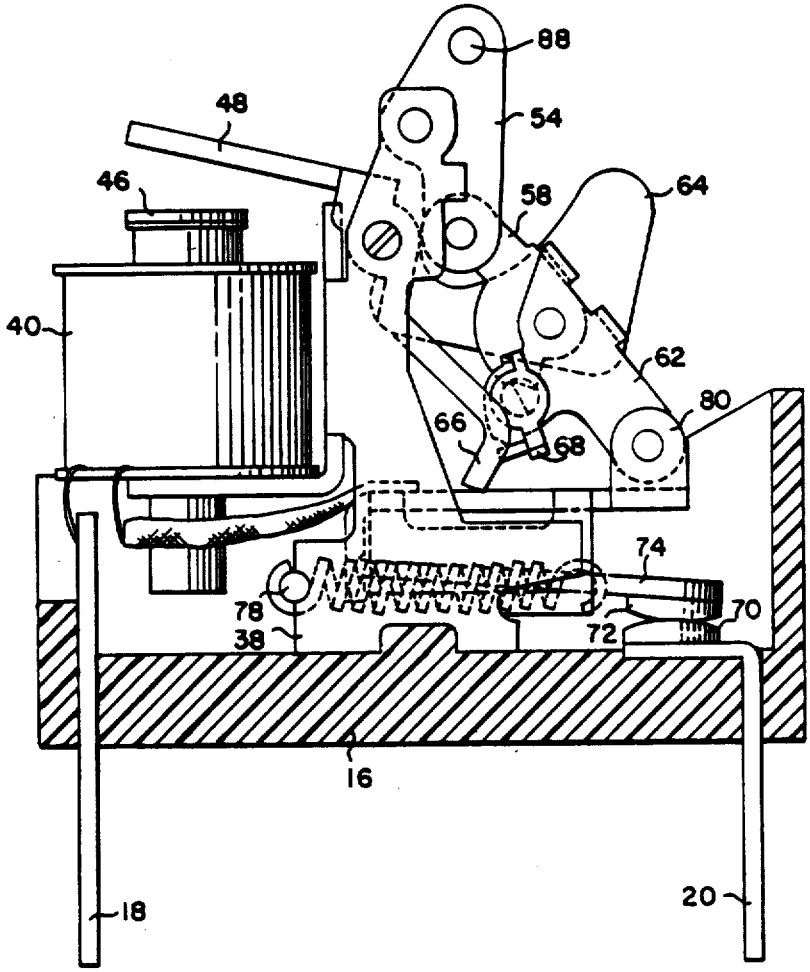
FIG. 4 is a view similar to FIG. 2 showing the circuit breaker contacts in the manually closed position.
Figure 5:
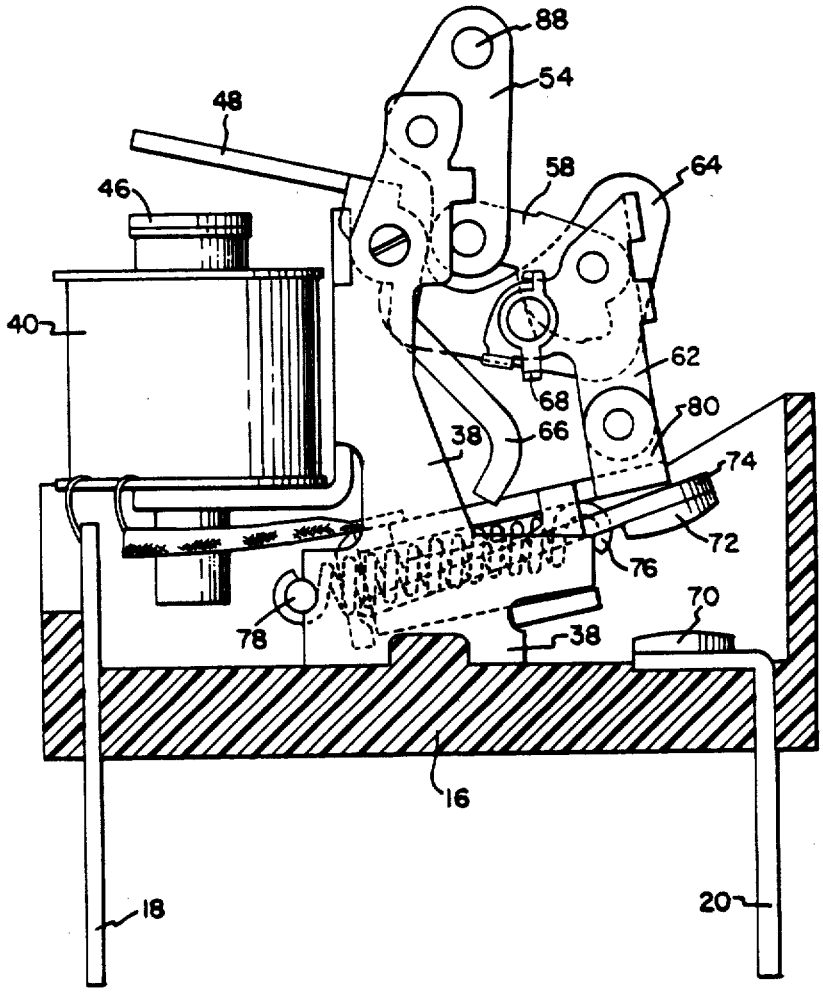
FIG. 5 is a view similar to FIGS. 2 and 4 showing the circuit breaker mechanism when the contacts are in the tripped open position.

FIG. 2 is a side view showing the lower case half 16 and the circuit breaker trip mechanism generally indicated at 36 and illustrated in FIG. 2 in the manually open position. FIG. 3 is a cross section of the mechanism of FIG. 2 taken at right angles to it, FIG. 4 is a view similar to FIG. 2 with the contacts in the manually closed position and FIG. 5 is a similar view of the mechanism when the contacts have been tripped open by an over current. The construction is of the same general type as that disclosed in assignee's U.S. Pat. No. 3,806,848 but is significantly improved to provide a more compact and symmetrical operating mechanism construction.

Referring to FIG. 2, the mechanism 36 comprises a one piece frame 38 (shown in detail in FIGS. 16 through 18) upon which is mounted an over current trip coil 40. The coil is connected to a terminal 18 by way of an electrical lead 42 and surrounds a delay tube 44 terminating in a pole piece 46. By way of example only, the coil and delay tube assembly may be of the type shown and described in assignee's co-pending application Ser. No. 684,232 filed May 7, 1976, U.S. Pat. No. 4,062,052. Pole piece 46 is positioned adjacent one end of an armature 48 pivoted about a pin 50 secured to the frame 38.

Also pivoted to the frame by a pin 52, is a handle link 54 pivoted by a pin 56 at its lower end to a cam link 58. The cam link 58 connects to a second pivotal link by a pin 60 which second pivotal link is generally referred to as a housing link and is indicated at 62. Armature 48 at its other end on one side, carries an enlarged portion 64 which forms a counterweight for the end near the pole piece 46 and on its other side, carries a curved projection 66 adapted to engage and rotate a sear 68 which permits the cam link 58 and housing link 62 to collapse relative to each other under the influence of a blade spring.

Contact terminal 20 is connected with a stationary contact 70 which completes a circuit through the two terminals 18 and 20 by way of a movable contact 72 mounted on and carried by a blade 74. Blade 74 is acted on by an over center spring 76 to have a snap opening and snap closing operation, the other end of the spring being wrapped around a pin 78 secured to the frame. The other end of blade 74, as more fully described below, is pivoted to a blade carrier 80, which is pivoted by a pin 82 to the lower end of housing link 62. The two links, namely, the cam link 58 and the housing link 62 with the cooperating sear 68 are generally referred to as the latch mechanism. The electrical circuit is completed from the movable contact 72 by way of the blade and blade carrier, a braided wire 84 and a lead 86 to the other side of the coil.

FIG. 4 shows the mechanism moved to the contacts "closed" position with the handle link 54 having its upper end moved in a clockwise direction from the position illustrated in FIG. 2. This link acts through the latch mechanism previously described to bring movable contact 72 into engagement with stationary contact 70 to complete the circuit between terminals 18 and 20. Handle link 54 is rotated by a handle, as more fully described below, acting on handle link pin 88.

FIG. 5 shows the circuit breaker in the tripped open position. The latch mechanism has been collapsed by engagement of the end 66 of the armature with the sear trip bar 68. Over center spring 76 has caused the contact 72 to move away from contact 70. FIG. 5 illustrates the latch mechanism in the "trip free" position, that is, the contacts have opened due to an overload while the handle link is manually restrained in the closed position illustrated, which it assumed in FIG. 4. The armature has returned under the influence of an armature spring (not shown) to a position spaced from the pole piece 46. By manually moving the handle link 54 from the position illustrated in FIG. 5 to the position illustrated in FIG. 2, the unit becomes completely reset and ready for operation if the fault has been removed.

Figure 6:
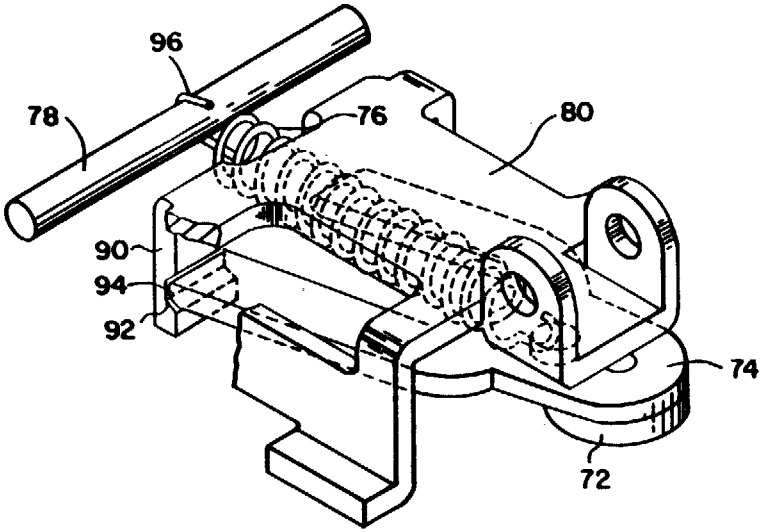
FIG. 6 is a perspective view of the over center spring assembly for the movable contact which produces the snap action.

FIG. 6 is an enlarged perspective view of the over current contact blade assembly. Blade carrier 80 has a turned over end 90 with a tapered groove 92 receiving a knife edge at 94 of the blade 74 so that blade 74 pivots in groove 92. Spring 76 has one end 96 wrapped around the pin 78 and its other end received through an aperture in the blade 74. The operation of the blade and blade carrier is essentially the same as in U.S. Pat. No. 3,806,848 and will not be described in further detail.

Figure 7:
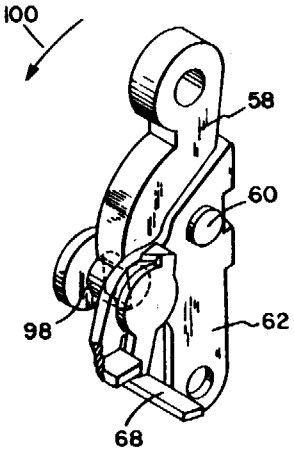
FIG. 7 is a perspective view of the latch mechanism of the circuit breaker.

FIG. 7 is a perspective view of the collapsible latch mechanism. It comprises the cam link 58 and the housing link 62. pivoted to each other by a pin 60. When the end 66 of the armature, as illustrated in FIG. 2, hits the trip bar, commonly called the striker bar 68, it moves this bar causing a sear pin 98, mounted in the two sides of housing link 62, to rotate. Sear pin 98 has a central portion cut away to form a semi-circular cross section and when it is rotated it releases the cam link and permits it to rotate in the direction of the arrow 100 about pin 60 relative to the housing link 62 producing mechanism collapse.

Figure 9:
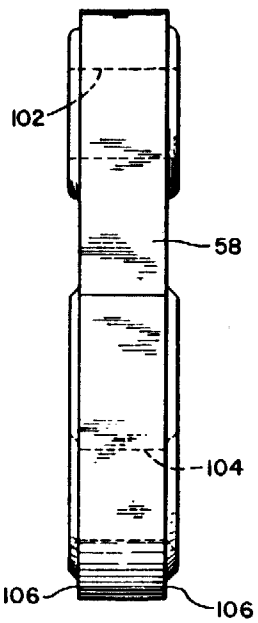
FIG. 9 is an edge view of the cam link of FIG. 8.
Figure 8:
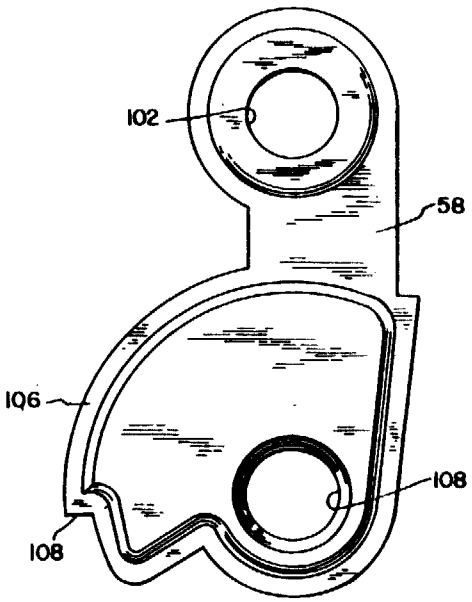
FIG. 8 is a side view of the cam link forming a portion of the latch mechanism of FIG. 7.

FIG. 8 is a side view and FIG. 9 is a front edge view of the cam link 58. It is provided with upper and lower apertures 102 and 104 adapted to receive respective pivot pins, with a first cam surface 108 adapted to bear against the sear pin 98 before it is rotated and a second cam surface 106 which along with the identical surface of the opposite side of the cam link, engages the slot in the sear pin 98. This prevents excessive lateral movement of the sear pin and thereby keeps it captive in the housing link, both in the latched position and when the cam link is rotated in a counterclockwise direction indicated by the arrow 100 in FIG. 7.

FIG. 10 is a side view and FIG. 11 is a front view of the housing link 62 forming a part of the toggle mechanism of FIG. 7. FIG. 12 is a view of the housing link 62 from the opposite side and FIG. 12 is a bottom plan view. It comprises a pair of parallel spaced plates 110 and 112 joined by a pair of integral straps 114 and 116 and with respective upper apertures 118 and 120 and respective lower apertures 122 and 124 for appropriate pivot pins. Formed in the parallel projections 126 and 128 are the apertures 120 and 132 for receiving the sear pin. Tab 134 acts as a stop for striker bar 68 in FIG. 7.

FIG. 14 is a side view of the handle link 54 and FIG. 15 is an edge view. The handle link again comprises what is substantially a pair of parallel plates 136 and 138 with respective upper pivot apertures 140 and 142 and lower respective pivot apertures 144 and 146. The two plates are joined by a central portion 148 in FIG. 15 and with a laterally extending boss 150 having a central aperture 152 adapted to receive a pivot pin which secures the handle link to the frame as indicated, for example, at 52 in FIG. 2.

Figure 17:
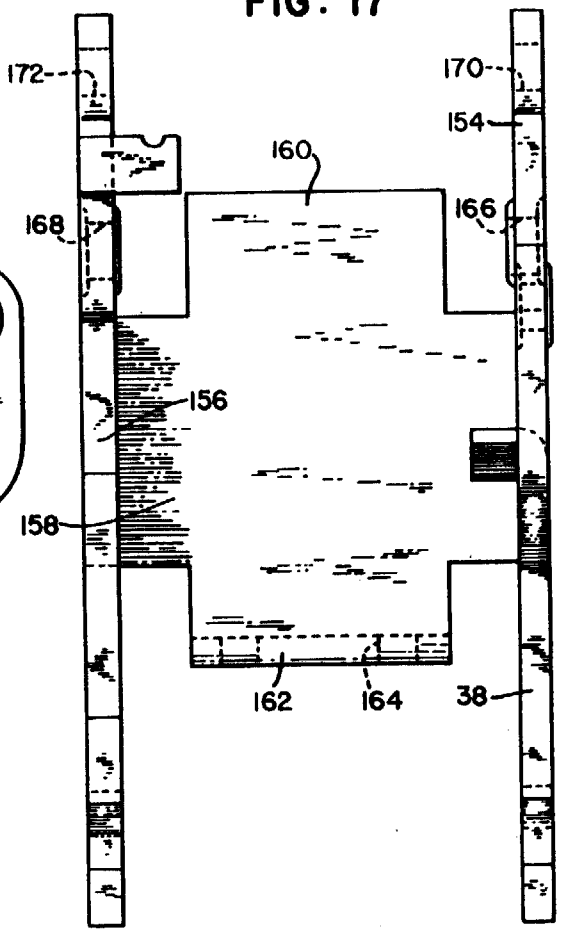
FIG. 17 is a side view of the frame of FIG. 16.
Figure 16:
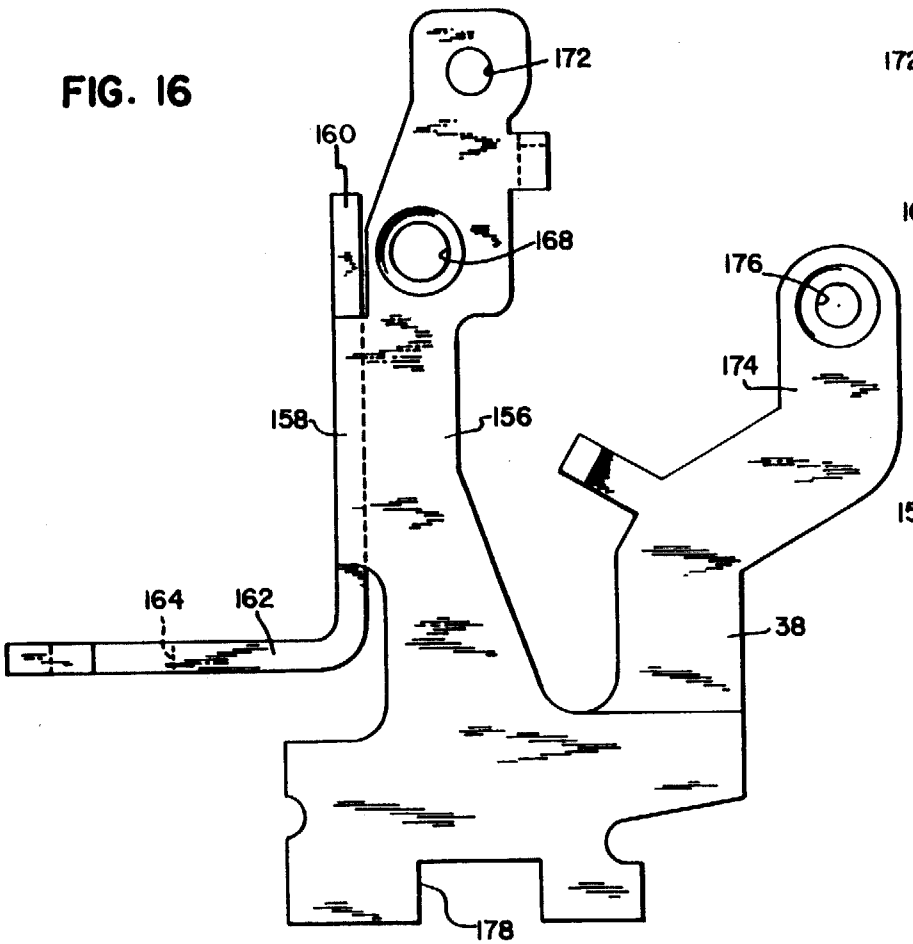
FIG. 16 is a side view of the one piece frame forming a major component of the mechanism illustrated in FIGS. 2 through 5.

FIG. 16 is a side view of the one piece frame as it is shown in FIG. 2. FIG. 17 is an edge view and FIG. 18 is a top plan view of the one piece frame. Again, the frame comprises essentially, a pair of parallel plates 154 and 156 joined by a central strap 158 having a projection 160 at its upper end and an outwardly bent tab 162 at its lower end, which tab supports the coil 40 in FIG. 2. This tab is apertured at 164 to receive the lower end of the delay tube 44 in FIG. 2. The two plates, 154 and 156 of the frame have corresponding apertures 166 and 168 adapted to receive the pivot pin 50 of FIG. 2 which pivots the armature to the frame. Above these are further corresponding apertures 170 and 172 which receive the pivot pin 52 of FIG. 2 about which the handle link 54 rotates or pivots. An outward projection on plate 38 indicated at 174 in FIGS. 16 and 18 is provided with an aperture 176 adapted to rotatably receive an inertia wheel of the type illustrated particularly in FIGS. 10 and 11 of assignee's U.S. Pat. No. 3,497,838. This inertia wheel is operated by the counterweight portion 64 of the armature through a slot and pin coupling of the type disclosed in that patent. The inertia wheel construction is optional in the circuit breaker of the present invention and is normally only incorporated in those devices used in situations where nuisance tripping is a serious problem. The lower end of each plate 154 and 156 is notched as indicated at 178 in FIG. 16 to engage a projection on the molded circuit breaker case such as that indicated at 180 in FIG. 2 to properly position and align the frame in the case.

Figures 19, 20, 21, 22:
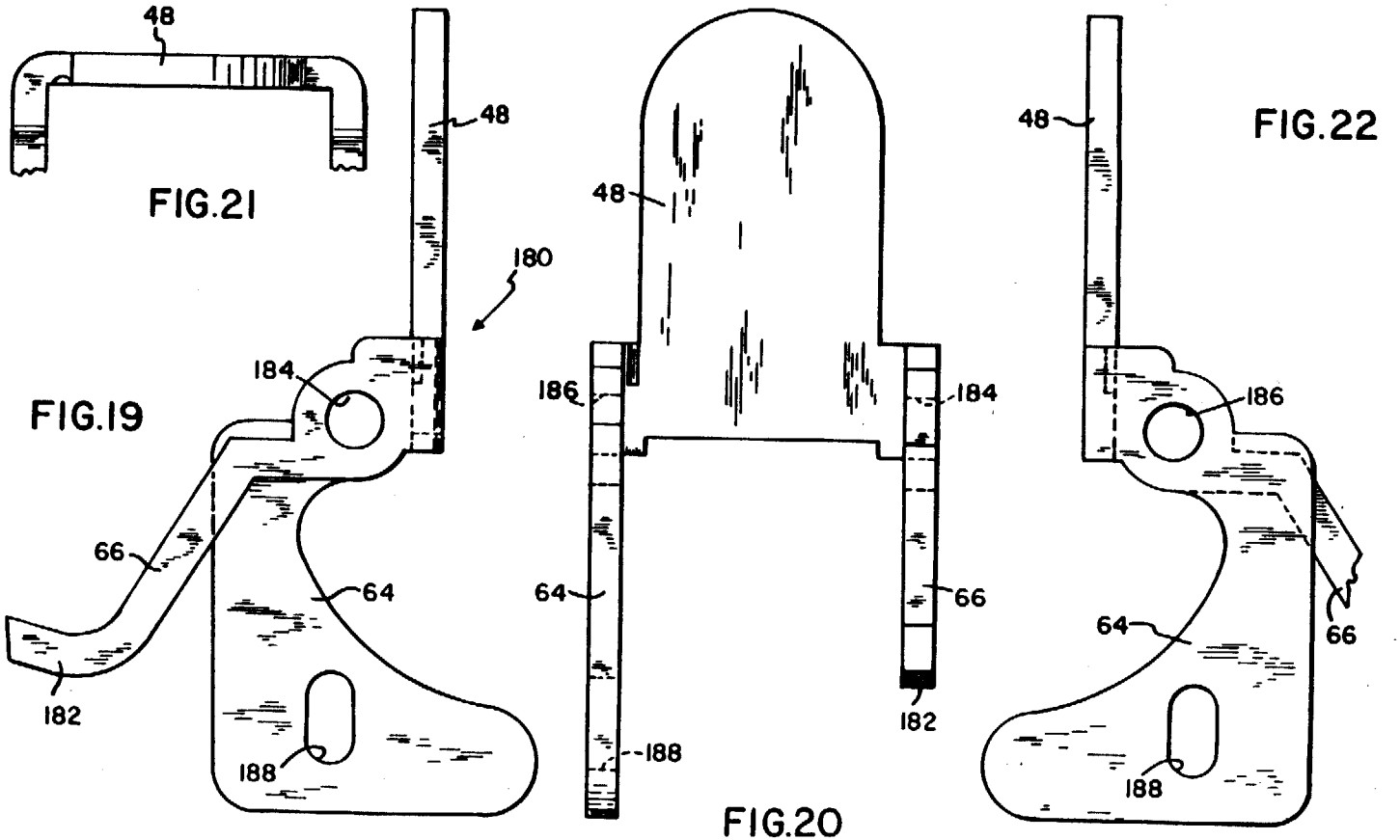
FIG. 19 is a side view of the armature illustrated in FIGS. 2 through 5.
FIG. 20 is a front view of the armature of FIG. 19.
FIG. 21 is a partial top view of the armature.
FIG. 22 is a view of the armature from the other side relative to FIG. 19.

FIG. 19 is a side view of the armature generally indicated at 180. FIG. 20 is a front view of the entire armature, FIG. 21 is a partial top plan view and FIG. 22 is a view from the other side showing the other leg of the armature, while the position of the amature in FIG. 19 corresponds to the position illustrated, for example, in FIG. 2. The latch tripping leg extends downwardly and terminates in a curved end 182 and this leg is provided with a pivot aperture 184. The other leg of the armature forming the counterweight 64 has a corresponding pivot aperture 186 and includes an elongated slot 188 near its lower end adapted to engage a pin on an inertial wheel to form an inertial delay coupling of the type shown in assignee's U.S. Pat. No. 3,497,838 as previously described. In the device of this invention, the slot 188 is formed in that portion of the armature removed as far as possible from the pivot aperture 186. This makes it possible to form the frame 38 out of a single piece of relatively inexpensive magnetic material, such as steel. This permits the inertial wheel to operate in the manner described in the above patent to provide an inertial tripping delay to the armature which is in addition to the tripping delay provided by the delay tube 44.

FIG. 23 is a view similar to FIG. 1 with parts in section, illustrating how the toggle handle 34 is connected to the handle link pin 88. FIG. 24 is a partial cross section through the circuit breaker 10 of FIG. 23 taken at right angles to the view in the previous figure. The assembly technique is somewhat similar to that illustrated in FIGS. 1 through 3 of assignee's U.S. Pat. No. 3,749,873. Similar to that arrangement, the boss 32 of the molded case, is provided with a pair of cooperating circular projections 190 and 192, which snap in to corresponding recesses 194 and 196 in the sides of toggle handle 34. These recesses are continuous with grooves 198 at 200. The pins snap into the recesses by snapping by the projections 202 and 204 on each side, best seen for example, in the exploded view of FIG. 25, which have sufficient resiliency to open slightly to permit passage of the corresponding round projection and then closes sufficiently to hold the handle relative to the case.

The toggle handle 34 carries a central portion in the form of an actuator 206 which has a slot 208 in its lower end which slides over and engages the handle link pin 88 carried by the handle link 54. In order to insert the toggle handle, the mechanism, during assembly, is placed in the manually open position illustrated in FIG. 2 with the handle link 88 in the position illustrated in FIG. 2, which is also the position in which it is shown in FIGS. 23 through 25. The toggle handle 34 is then tilted in a slightly clockwise direction as illustrated in FIG. 25 and inserted into the boss 32 with the molded plastic material of the case having sufficient resiliency such that the projections 190 and 192 slide up the grooves and into the recesses 194 and 196 as the slot 208 of the actuator slides over the handle link pin at 88. Once the handle has been inserted in this manner, it is very difficult to remove and for all practical purposes, is permanently attached to the upper portion 14 of the circuit breaker case by rocking it back and forth between right and left positions. The toggle mechanism may be manually actuated to move between the contact open position of FIG. 2 and the contact closed position of FIG. 4.

FIGS. 26 and 27 show the details of the lower molded case section 16. This is illustrated in FIG. 26 as having a central protrusion 210 which has been omitted from the previously described figures for the sake of clarity. It also shows projections 212 and 214 adapted to be received in corresponding slots in the upper case section 14 and which projections correspond on the other side of the lower case section 16 to the projections 22 and 24 previously described. Each one of the sides 216 and 218 is provided with a corresponding set of three arc chute slots 220 in FIG. 26 and 222 in FIG. 25 adjacent the contact terminal 20 and remote from that portion of the case receiving the coil terminal 18. Magnetic metallic arc baffle elements are simply slipped into the case through grooves 220 and 222 and are retained in position by the upper or outer case section 14 when molded circuit breaker case sections 14 and 16 are slipped together.

FIG. 28 shows a modified case construction and this embodiment is generally designated at 220. The upper case section 222, comprises a pair of resilient mounting "wings" of the type shown in assignee's U.S. Pat. No. 3,749,873, preferably serrated at 228 and 230 to provide roughened outer surfaces which assist in mounting it to an instrument panel along with the integral rim 232. This embodiment is characterized principally by the fact that it incorporates a rocker handle 234.

Figure 29:
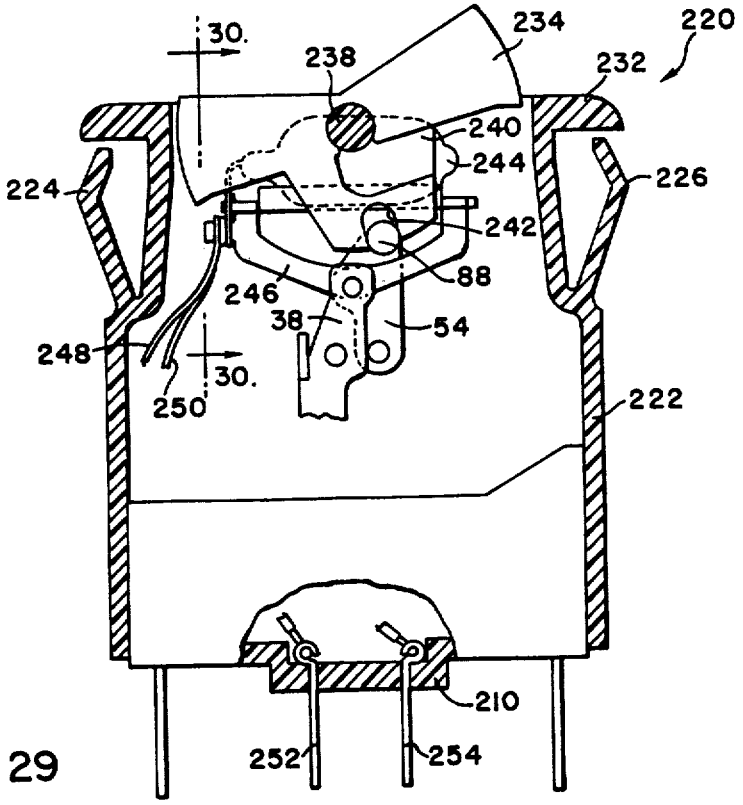
FIG. 29 is a partial cross section through the modified construction of FIG. 28 showing the manner of connecting the rocker handle to the handle link.
Figure 30:
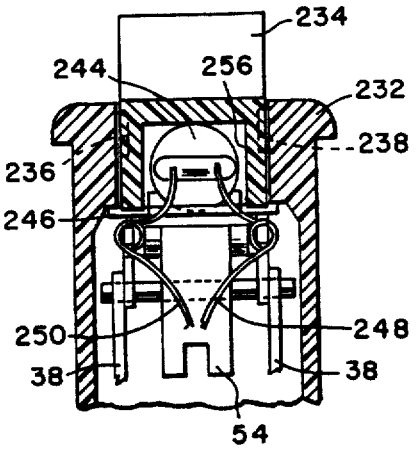
FIG. 30 is a partial cross section taken along lines 30—30 of FIG. 29.

Referring to FIG. 29, the circuit breaker 220 has a rocker handle which, as previously described, is received by a pair of circular projections formed integral with the inside of the breaker housing as indicated by dash lines at 236 and 238 in FIG. 30. These are received in cooperating circular recesses in the handle 234 and communicate with grooves on each side such as the groove 240 in FIG. 29. The handle structure is essentially the same as in assignee's U.S. Pat. No. 3,749,873. At its lower end, it is provided with a slot 242 which engages and drives the pin 88 of the handle link 54. Beneath the rocker handle 234 is a lamp 244 mounted on a lamp bracket or holder generally indicated at 246. The lamp is connected by leads 248 and 250 to lower case center terminals 252 and 254 which pass through suitable apertures in the lower case central projection 210. As best seen in FIG. 30, the two sides of the frame 38 support the lamp bracket 246 on which, in turn, is mounted the lamp 240. This is retained in the hollow space portion 256 in the underside of rocker handle 234.

Figure 31:
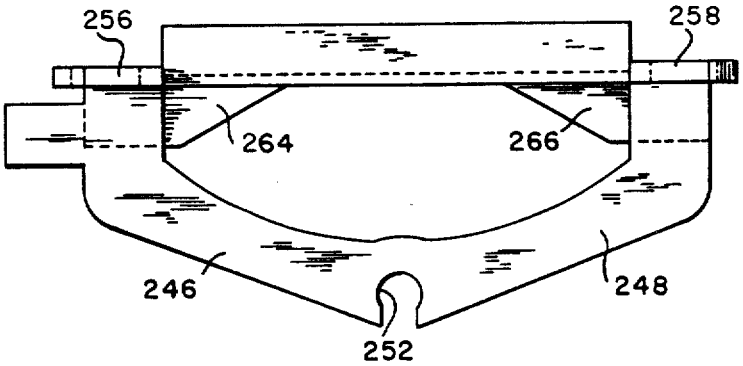
FIG. 31 is a front plan view of a lamp bracket forming a part of the structure of FIGS. 29 and 30.
Figure 32:
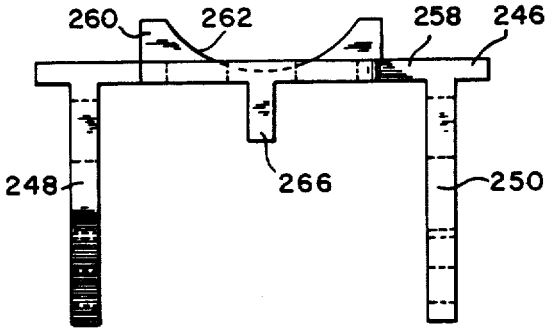
FIG. 32 is an end view of the lamp bracket of FIG. 31.
Figure 33:
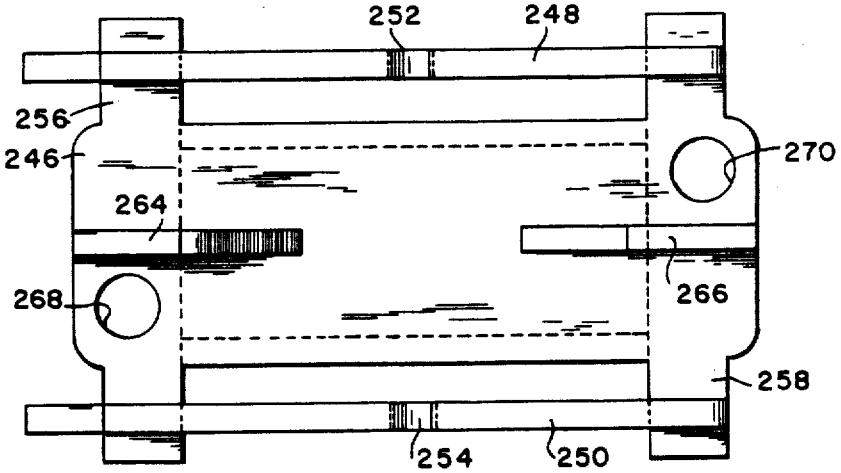
FIG. 33 is a top plan view of the lamp bracket of FIG. 31.

FIG. 31 is an enlarged view of the lamp bracket 246, FIG. 32 is an end view of the lamp bracket and FIG. 33 is a top plan view of it. The bracket comprises a pair of bow shaped support arms 248 and 250 each with central slots, 252 and 254, by means of which the bracket is secured to the pin 52. These support arms are formed integral with a pair of cross bars 256 and 258 which, in turn, support an elongated, shallow subtantially U-shaped member 260 having a central recess curved in the shape of a portion of a circle, as illustrated at 262 to conform with and support the underside of the lamp 240. A member 260 is provided with reinforcing ribs 264 and 266 and a pair of holes 268 and 270. In normal practice, the lamp just sits in the shallow semicircular groove 262 but, if desired, it may actually be attached to as well as supported by the bracket through the use of a small amount of epoxy adhesive.

Figure 34:
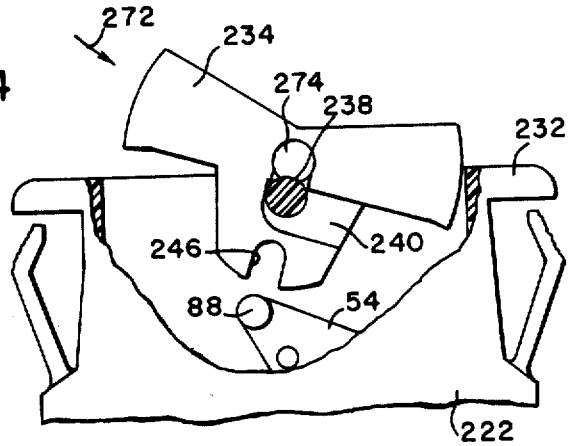
FIG. 34 is a partial cross section showing a step in the process of attaching the rocker handle to the circuit breaker case.
Figure 35:
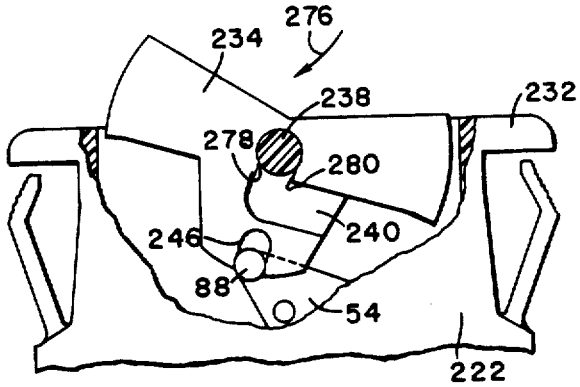
FIG. 35 is a view similar to FIG. 34 showing the rocker handle mounted in the case and engaging a handle link.

FIGS. 34 and 35 illustrate how the rocker handle 234 is inserted into the circuit breaker housing. The handle is first inserted in a righthand and downward direction, as illustrated by the arrow 272 in FIG. 34 so that the circular projection 238 slides into and along groove 240 and the corresponding projection on the other side of the outer case 222 slides along its similar corresponding groove. In order to get the projection into the corresponding rocker handle recesses, such as the recess 274 in FIG. 34, the rocker handle is then moved more vertically downwardly and to the left as indicated by the arrow 276 in FIG. 34, so that the projection 238 snaps past the lips 278 and 280 and groove, or slot, 246 slips over the handle link at 88. As before, this is done with the mechanism of the circuit breaker set in the manually open contact position of FIG. 2.

Figure 36:
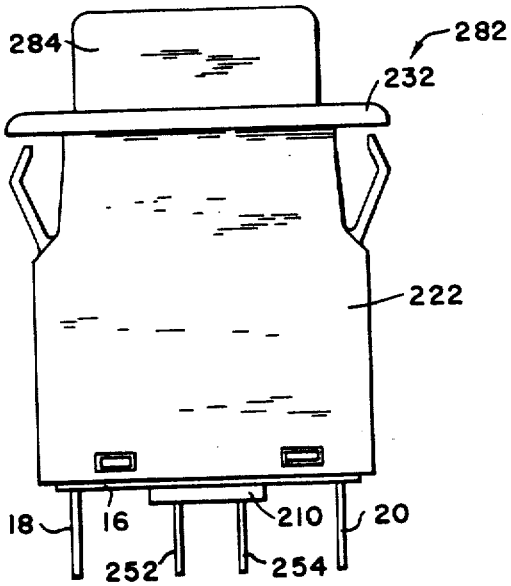
FIG. 36 is a front elevation of a further modified embodiment in accordance with the present invention showing a push button type handle for the circuit breaker.
Figure 37:
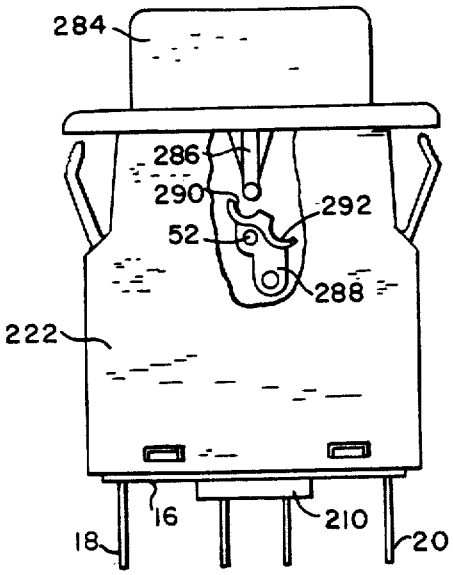
FIG. 37 is a front elevation with a part in section showing the handle link in the "on" position.
Figure 38:
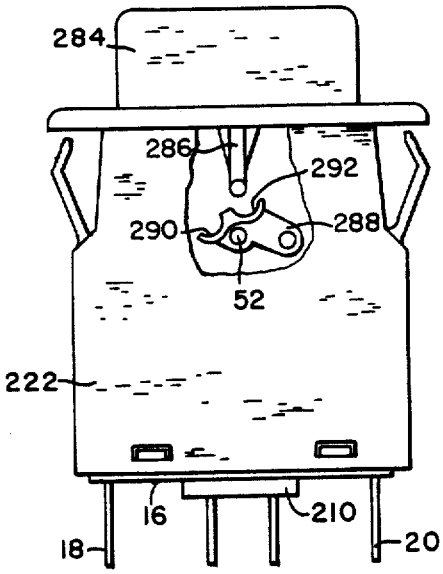
FIG. 38 is a view similar to FIG. 37 showing the handle link in the "off" position.

FIG. 36 shows a further modified embodiment generally indicated at 282, in which like parts again bear like reference numerals. This circuit breaker embodiment has an upper case 222 similar to the embodiment shown in FIG. 28 but is characterized by a push button type handle 284. In this embodiment, the circuit breaker operation is push to open, push to close and this action is illustrated in FIGS. 37 and 38, the former illustrating the circuit breaker mechanism in the manually "on" position with the contacts closed, while FIG. 38 shows the "off" position or manual contacts open position of FIG. 2. Handle 284 is provided with an actuator, a portion of which is illustrated at 286 in FIGS. 37 and 38 and the mechanism is provided with a modified handle link 288 having a pair of semicircular grooves or recesses 290 and 292. When the device is in the position illustrated in FIG. 37, downward pressure on the button 284 causes the actuator to enter groove 290 rotating the handle link 288 in a counterclockwise direction into the position illustrated in FIG. 38. A second depression of the button 284 when the device is in the position illustrated in FIG. 38, causes the actuator 286 to enter the recess 292, rotating the handle link 288 in a clockwise direction about a pivot pin 52 back into the closed or on position of FIG. 37. Successive depressions of the push button handle similarly cause the handle link to rotate back and forth by alternate entrance of the actuator 286 into the respective grooves 290 and 292.

Figure 39:
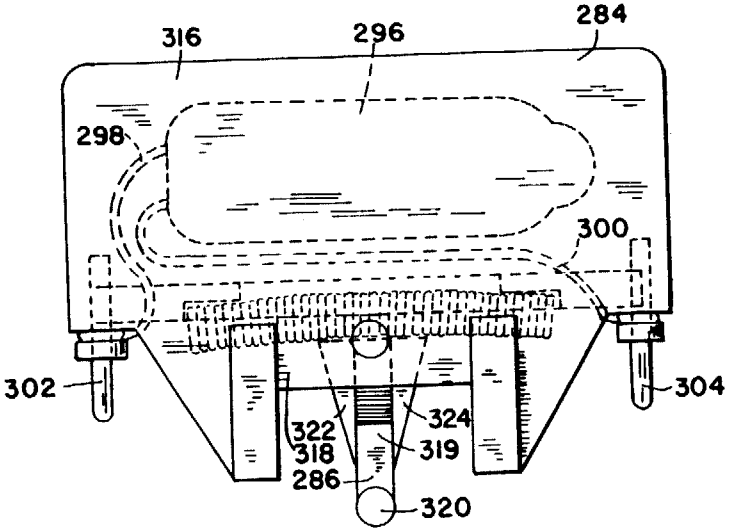
FIG. 39 is a front elevation of the push button type handle of the embodiment of FIG. 36.
Figure 40:
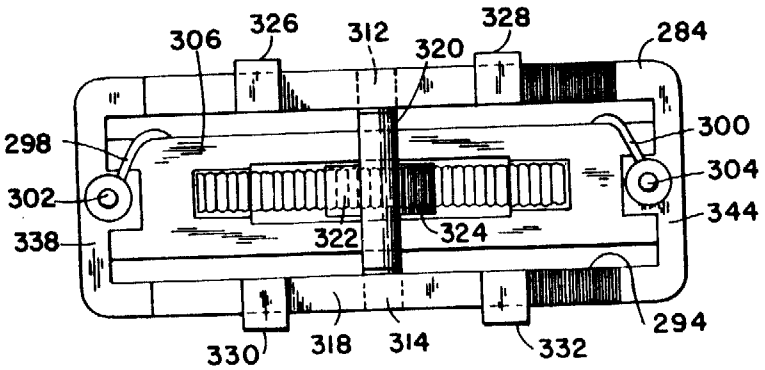
FIG. 40 is a bottom plan view of the handle of FIG. 39.
Figure 41:
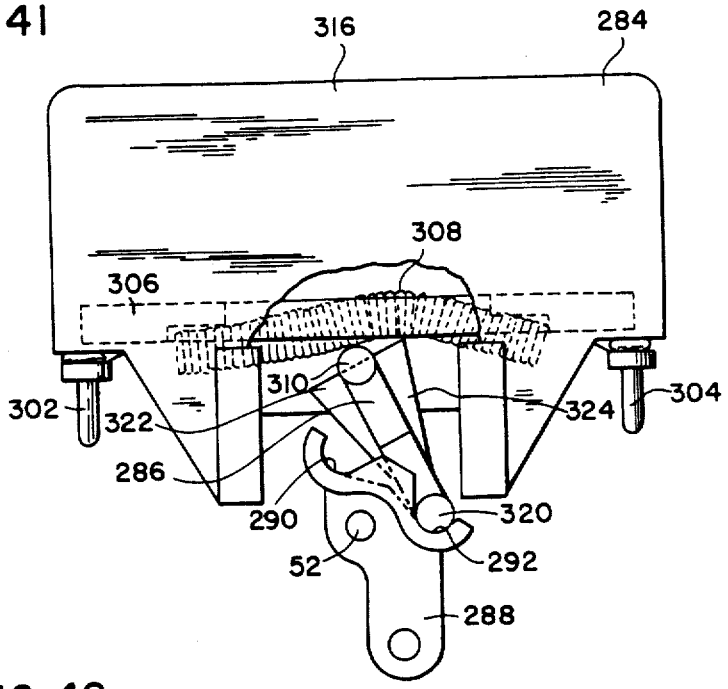
FIG. 41 is a front view of the handle illustrating the engagement of the actuator blade of the handle with a handle link.

FIG. 39 is a front view to an enlarged scale with portions in dash lines showing the push to open, push to close handle 284 of FIGS. 37 and 38. FIG. 40 is a bottom plan view of the push button handle 284 and FIG. 41 is a front view similar to FIG. 39 with a portion in section showing the distortion of the actuator spring during operation.

Referring to FIGS. 39 and 40, the push button handle 284 similar to the rocker handle previously described, has a hollow interior 294 which receives a lamp indicated by dash lines at 296 in FIG. 39. This lamp is connected by electrical leads 298 and 300 to electrically conductive spring guide pins 302 and 304. Carried by the push button, there is an actuator spring support 306 which carries an elongated coiled actuator spring 308. The spring is retained by the support at each end and is free to deflect in the middle as indicated in FIG. 41. It is engaged by actuator blade 286 which comprises at its upper end, a pivot 310 having its ends rotatably received in apertures 312 and 314 (FIG. 40) in the side walls 316 and 318 of the push button. This pivot is connected by a centerpiece 319 to a lower pin or actuator blade 320 which engages in the respective grooves 290 and 292 of the handle link as illustrated in FIG. 41. Extending from the centerpiece 319 are a pair of wings 322 and 324 whose upper edges or shoulders engage and deflect the center portion of spring 308 as the shoulder of wing 324 is shown doing in FIG. 41. It is understood that when the actuator 286 pivots in the opposite direction with the actuator blade or pin 320 received in the slot 290, the shoulder of the other wing, 322 similarly engages and deflects a corresponding central portion of spring 308. Also forming a part of the handle 284 and formed integral with it are the four ribs, 326, 328, 330 and 332, which are involved in the joining of the handle to the circuit breaker case as more fully described below.

Figure 42:
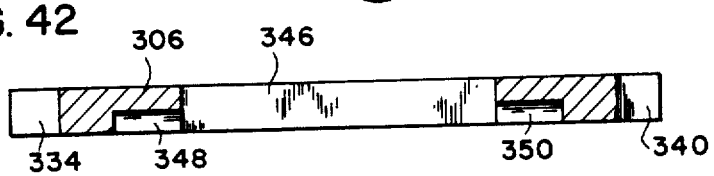
FIG. 42 is a front elevation of the spring support for the spring forming a part of the handle illustrated in FIGS. 39 through 41.
Figure 43:
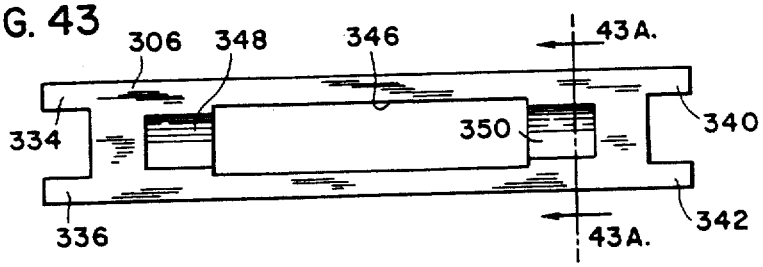
FIG. 43 is a bottom plan view of the spring support of FIG. 42.
Figure 43A:
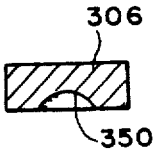
FIG. 43A is a cross section taken along the line 43A—43A of FIG. 43.

FIG. 42 is a central cross section through the spring support 306 of FIG. 40, FIG. 43 is a bottom plan view of the spring support and FIG. 43A is a cross section taken along line 43A—43A of FIG. 43. The spring support 306 is shown as having a pair of projections 334 and 336 at one end engaging one end wall 338 of the pushbutton in FIG. 40 and a similar pair of projections 340 and 342 engaging the other end wall 344. The center of the support 306 has a rectangular aperture at 346 to permit upward deflection of the center portion of the spring as illustrated in FIG. 41. The ends of the spring are received in semicircular cross section cutaways 348 and 350 communicating with the central aperture 346. One cutaway 350, is shown in FIG. 43A and it is understood that the other cutaway 348 is a mirror image of cutaway 350.

Figure 45:
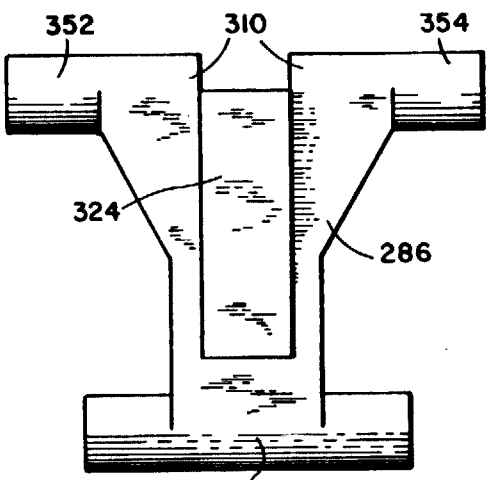
FIG. 45 is an enlarged side view of the actuator blade of FIG. 44.
Figure 44:
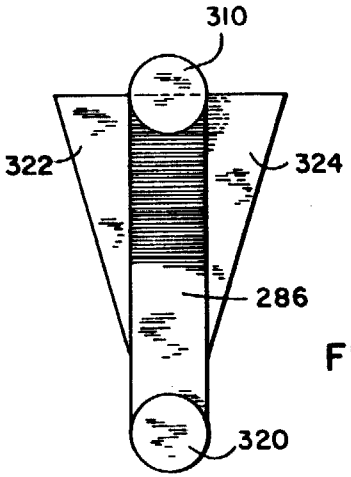
FIG. 44 is an enlarged front view of the actuator blade shown as part of the assembly in FIG. 41.

FIG. 44 is a front view and FIG. 45 is a side view of the actuator 286. As can be seen in FIG. 45, the top pivot 310 is, in fact, made of two separate pivot portions 352 and 354.

Figure 46:
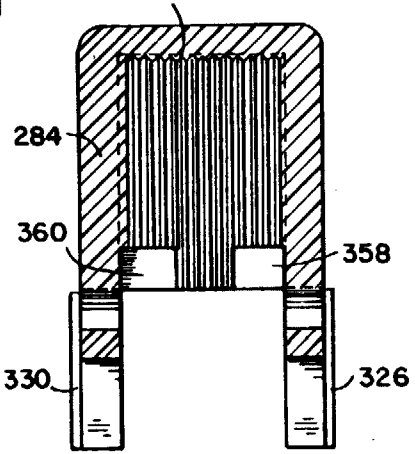
FIG. 46 is a cross section through the center of the push button of the embodiment of FIG. 36.
Figure 47:
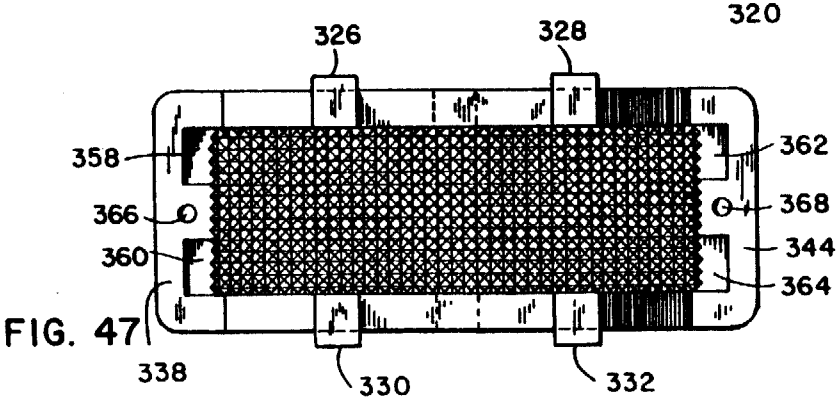
FIG. 47 is a bottom plan view of the push button of FIG. 46.

FIG. 46 is a central transverse cross section through the handle 284 and FIG. 47 is a bottom plan view of the handle by itself corresponding to the plan view of FIG. 40. The pushbutton is preferably made of a suitable plastic such as a clear lexan type 141 and is preferably roughened or knurled on its inside surface as indicated at 356 in FIGS. 46 and 47. Each end of the handle is provided with a pair of recesses such as the recesses 358 and 360 in the end 338 for receiving the corresponding projections 334 and 336 of the spring support illustrated in FIG. 43. The other edge wall 344 is similarly provided with recesses 362 and 364 for receiving the projections 340 and 342 of the spring support 306 of FIG. 43. These recesses act to limit the upward movement of the spring support relative to the interior of the push button. The end walls also contain apertures 366 and 368 for receiving the spring pins 302 and 304 of FIG. 39.

Figure 48:
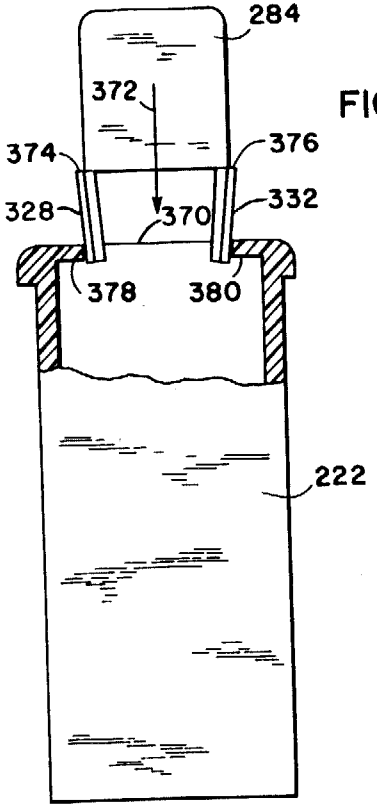
FIG. 48 is a diagrammatic view illustrating a step in the assembly of the push button with the circuit breaker case and, FIG. 49 is an exploded view showing the electrical lamp connections for the lamp carried in the push button of the embodiment of FIG. 36.

FIG. 48 is a diagrammatic view showing the manner of originally inserting the button into the top of the case. The case top is apertured as at 370 and the lower portion of the button including the ribs, such as those illustrated at 328 and 332 in FIG. 48, are squeezed together as the button is pushed downwardly in the direction of the arrow 372 in FIG. 48. The plastic of the handle and the plastic of the case are both sufficiently resilient that the button can be pushed in till the tops of the ribs, such as those illustrated at 374 and 376 in FIG. 48 snap outwardly underneath the ledges or inner rim portions 378 and 380 of the case to limit the outward movement of the handle and to prevent it from being removed once it has been inserted into the upper section of the circuit breaker case.

Figure 49:
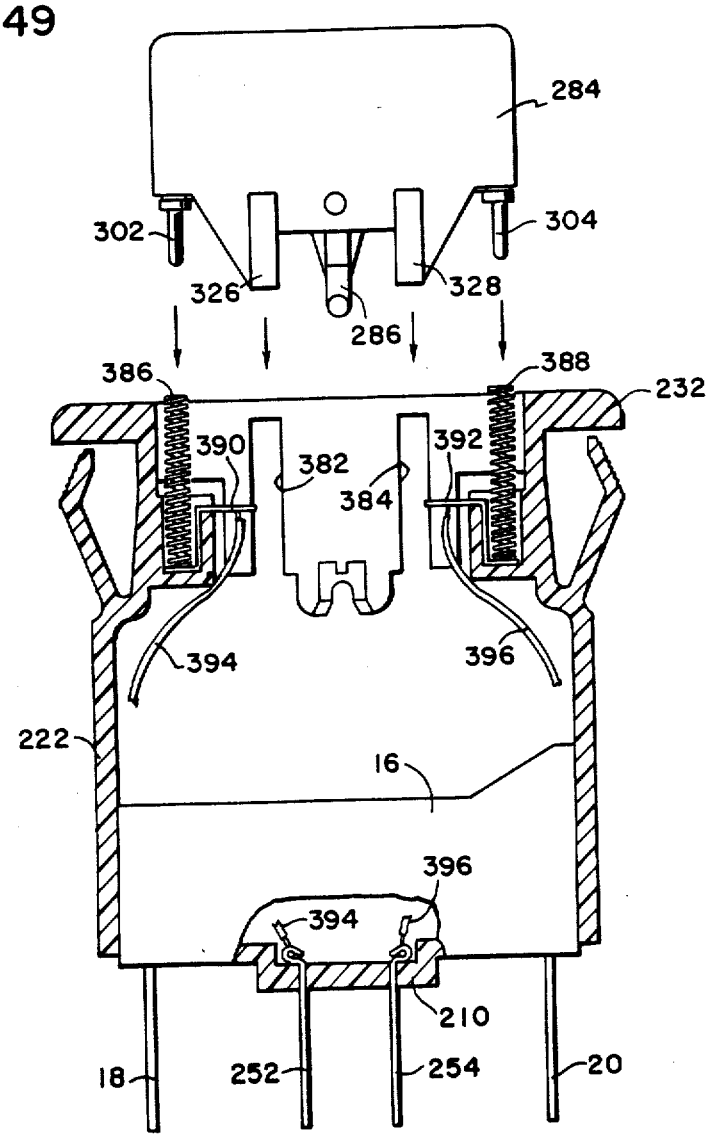

FIG. 49 is an exploded view illustrating the complete assembly of the pushbutton embodiment of the circuit breaker case. The assembly is accomplished in two principal steps, namely, the lower case section with the mechanism mounted on it is first snapped into place through the lower end of outer case section 222. Once this has been done with the mechanism in the proper position, i.e., on the handle link positioned in the manually contacts open location, the handle is then inserted into the upper end of the outer case section 222 with the actuator mechanism of the handle properly engaging the handle link. This sequence of assembly holds true for all embodiments. In FIG. 49, the push button handle 284 is properly aligned by receipt of the ribs in corresponding grooves on the inside surface of the case such as the grooves illustrated at 382 and 384. Electrical connection to the lamp in this embodiment is by way of the handle spring 386 and 388 whose upper ends receive the spring guide pins 302 and 304. Spring 386 and 388 urge the handle in the upward direction with the upper edges of the ribs engaging the upper end of the corresponding slots or grooves such as those just mentioned at 382 and 384. In addition, the springs and pins provide an electrical circuit which is completed by way of a pair of wire connectors 390 and 392 which engage the bottom ends of handle springs 386 and 388 (coil compression springs) and also electrically connecting to the leads 394 and 396 much in the manner of the rocker handle embodiment previously described which ultimately lead to the lamp terminals 352 and 354.

It is apparent from the above that the present invention provides an improved snap action circuit breaker mechanism which may be very compactly constructed with a symmetrical arrangement and a variety of handle mechanisms utilizing the same basic structure. This makes it possible for the circuit breaker to be used in visible locations such as on an instrument panel, much in the manner of a conventional switch. The attractive and symmetrical appearance of the various circuit breaker handles is consistent with modern instrument panel design and the manual snap action makes it impossible to "tease" the circuit breaker and is consistent with the on-off operation of most conventional switches. In this way, the device of this invention provides the advantages of a simple switch but adds to that, overcurrent protection in the form of an overcurrent sensing coil and collapsible mechanism By incorporating the delay tube construction and inertial delay, nuisance tripping is, for all practical purposes, eliminated and the device may be used as a switch and relied upon for its operation in the manner of a conventional switch but with the added feature of electrical circuit protection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A circuit breaker comprising an electrically insulating plastic housing, and overcurrent trip coil and armature in said housing, a stationary and a movable contact in said housing, a latch mechanism coupled to said movable contact for manually moving it between contacts open and contacts closed positions, said latch mechanism having a sear for collapsing it in response to movement of said armature, means coupled to said movable contact for opening and closing said contacts with a snap action, a handle link coupled to said latch mechanism, said case having a handle opening communicating with said handle link, and a handle passing through said opening and coupled to said handle link, the pivot axis of said handle link lying at least substantially in a central transverse plane through the shorter dimension of said circuit breaker case with said handle opening symmetrically located in said case.

2. A circuit breaker according to claim 1 wherein said snap action means comprises an overcenter spring.

3. A circuit breaker according to claim 1 wherein said handle comprises a toggle.

4. A circuit breaker according to claim 1 wherein said handle comprises a rocker.

5. A circuit breaker according to claim 1 wherein said handle comprises a push button.

6. A circuit breaker according to claim 1 comprising a frame of magnetic material supporting said coil in said case.

7. A circuit breaker according to claim 1 comprising a one piece frame of magnetic material supporting said coil, armature, toggle and handle link in said case.

8. A circuit breaker according to claim 7 wherein said armature comprises a pair of legs remote from said coil, one of said legs operating as a trip for said sear, and the other of said legs acting as a counterweight for the portion of the armature adjacent said coil.

9. A circuit breaker according to claim 8 including a delay tube surrounded by said coil.

10. A circuit breaker according to claim 9 wherein said counterweight leg of said armature carries a portion of a pin and slot combination of coupling said counterweight leg to an inertial time delay wheel.

11. A circuit breaker according to claim 9 wherein said counterweight leg of said armature is provided with a slot at a location adjacent the portion of it most remote from said coil for coupling to the pin of a inertia wheel.

12. A circuit breaker comprising a molded plastic housing formed of an upper outer section and a lower section telescoped into said upper section, a one piece frame carried by the lower section of said housing, an overcurrent trip coil and armature mounted on said frame, a stationary contract on the lower section of said housing, a movable contact mounted on said frame, a latch mechanism on said frame coupled to said movable contact for manually moving it between contacts open and contacts closed positions, said latch mechanism having a sear for collapsing it in response to movement of said armature, an overcenter spring coupled to said movable contact for opening and closing said contacts with a snap action, a handle link pivoted to said frame and coupled to said latch mechanism, said upper case section having a central symmetrical opening, the pivot axis of said handle link lying below the center of said opening to permit a symmetrical handle construction, and a handle passing through said opening and coupled to said handle link.

13. A circuit breaker according to claim 12 including a contact blade carrying said movable contact, and a carrier coupled to said latch mechanism, said contact blade being pivoted to said carrier.

14. A circuit breaker according to claim 13 wherein said overcenter spring comprises a coiled tension spring connected between said contact blade and said frame.

15. A circuit breaker according to claim 12 wherein said latch comprises a cam link coupled to said handle link, and a link housing coupled to said movable contact.

16. A circuit breaker according to claim 5 wherein said link housing is of substantially U-shaped cross section, the lower end of said cam link being pivotally received in the upper end of said link housing.

17. A circuit breaker according to claim 12 wherein said upper housing section comprises a boss surrounding said handle opening, said boss including opposing interior projections, said handle comprising a toggle type with a recess on each side receiving a corresponding projection, said handle link including a drive pin, said handle having a slot in its lower end received over said handle link pin.

18. A circuit breaker according to claim 17 in which said handle has a groove on each side communicating with said recesses whereby said handle may be assembled to said case by sliding it into said boss until said projections snap into said recesses.

19. A circuit breaker according to claim 12 wherein said lower case section is provided with arc baffle slots on each side, corresponding arc baffle plates being retained in said lower case section by the surrounding outer case section.

20. A circuit breaker according to claim 19 wherein said lower case section is provided with a pair of spaced projections on each side, said upper case section having corresponding slots into which said projections snap when said case sections are telescoped together, said upper case section having a pair of spaced vertical slots on each side communicating with its lower edge for increased resiliency during assembly.

21. A circuit breaker according to claim 17 wherein said upper case section includes opposing inferior projections, said handle comprising a rocker with a recess on each side receiving a corresponding projection, said handle link including a drive pin, said handle having a slot in its lower end received over said handle link pin.

22. A circuit breaker according to claim 21 in which said handle has a groove on each side communicating with said recesses whereby said handle may be assembled to said case by sliding it into said handle opening until said projections snap into said recesses.

23. A circuit breaker according to claim 22 wherein the interior underside of said rocker handle is hollow, a lamp bracket carried by said frame, and a lamp supported partly within said hollow interior of said rocker handle by said lamp bracket.

24. A circuit breaker according to claim 23 including a projection on the central bottom of said lower case section, a pair of lamp terminals extending outwardly from said projection, and a pair of electrical leads coupling said lamp to said terminals.

25. A circuit breaker according to claim 24 wherein said bracket has an elongated semicircular recess in which said lamp rests.

26. A circuit breaker according to claim 22 wherein the upper section of said circuit breaker case has a pair of wings and an annular rim for mounting said circuit breaker to an instrument panel.

27. A circuit breaker according to claim 12 wherein said handle comprises a push button.

28. A circuit breaker according to claim 27 wherein said handle and handle link cooperate to impart a push-to-open and push-to-close manual action to said circuit breaker.

29. A circuit breaker according to claim 28 wherein said handle link is provided with a pair of spaced grooves, said push button having an actuator which is received in each of said grooves with successive depressions of said button to rock said handle link back and forth about its pivot axis.

30. A circuit breaker according to claim 29 comprising a coiled tension spring in said handle, said actuator being pivoted for rocking movement and having a pair of shoulders which alternately engage a central area of said handle spring.

31. A circuit breaker according to claim 30 comprising a spring support in said handle, said spring support receiving the opposite ends of said spring and having a central opening permitting deflection of the central portions of said spring.

32. A circuit breaker according to claim 31 wherein said spring support has projections on each end received in recesses in said handle.

33. A circuit breaker according to claim 32 wherein said push button has a hollow center, and a lamp in said center.

34. A circuit breaker according to claim 27 including a pair of external ribs on each side of said push button, the tops of said ribs engaging said upper section of said housing and limiting the outward movement of said push button.

*35. A circuit breaker, comprising:*

*an insulated housing;*

*a frame located in said insulated housing;*

*an overcurrent sensor mounted to said frame in said housing;*

*a stationary contact and a movable contact in said housing;*

*a latch mechanism coupled to said frame and engageable by said overcurrent sensor and adapted to be tripped by said sensor in response to a sensed overcurrent;*

*a flat blade member having said movable contact mounted to one end portion thereof;*

*a movable carrier coupled to said latch mechanism and movable between first and second positions in response to movement of said latch mechanism, said carrier comprising;*

*a generally flat top plate,*

*a pair of side plates integral with and extending downwardly from said top plate,*

*a first pair of tabs integral with and extending upwardly from the front portion of said top plate for movably coupling said latch mechanism to said carrier,*

*a back end portion integral with and exending downwardly from said top plate and having a recess for pivotally receiving the other end portion of said flat blade member, and*

*a second pair of tabs integral with and extending laterally outwardly from the bottom portion of said side plate; and*

*an overcenter spring coupled at one end with said blade member and at its other end to said frame;*

*said frame also having a pair of pivot mounts located below and forward of said spring mounting means for pivotally receiving said second pair of tabs of said movable carrier.*

*36. The circuit breaker according to claim 35, wherein:*

*said blade and carrier means are pivotally mounted to said frame about said pair of pivot mounts such that when said latch means is moved towards the contacts closed position, said blade carrier pivots about said pair of pivot mounts in one direction until said recessed blade pivot mounting lies above said spring mounting means, whereby said overcenter spring exerts a force on said movable contact in the direction toward said stationary contact, and when the latch means is moved toward the contacts open position, said blade carrier pivots about said pair of pivot mounts in an opposite direction until said recessed blade pivot mounting lies below said spring mounting means, whereby said overcenter spring exerts a force on said movable contact in the direction away from said stationary contact.*

*37. The circuit breaker according to claim 36, wherein said frame comprises:*

*a central strap having an outwardly bent tab at one end, and a pair of substantially aligned side plates integral with and extending from opposite lateral sides of said strap, said side plates having first aligned openings for receiving spring mounting means for securing said overcenter spring to said frame and second aligned openings for receiving said movable carrier for pivotal movement of said carrier between said first and second positions.*

*38. The circuit breaker according to claim 37, wherein said overcurrent sensor includes an overcurrent trip coil mounted to said outwardly bent tab of said frame and an armature pivotably mounted to a pivot mounting means received in third aligned openings of said frame side plates.*

*39. The current breaker according to claim 38, further comprising handle link means coupled to said latch mechanism for manually moving said movable contact between closed and open positions; said frame side plates having fourth aligned openings for receiving a pivot mounting means for pivotably mounting said handle link means.*

*40. A circuit breaker comprising an electrically insulating housing, an overcurrent trip coil and armature in said housing, a stationary and movable contact in said housing, a latch mechanism coupled to said movable contact for manually moving it between contacts open and contacts closed positions, said latch mechanism having means for collapsing it in response to movement of said armature, means coupled to said movable contact for opening and closing said contacts with a snap action, a handle link coupled to said latch mechanism, an overcenter spring*

*coupled to said movable contact for opening and closing said contacts with a snap action, and a one piece frame supporting said coil, armature, latch mechanism, spring, and handle link in said case.*

*41. A circuit breaker, comprising:*

*an insulated housing;*

*an overcurrent sensor located in said housing;*

*a stationary contact in said housing;*

*a latch mechanism engageable by said overcurrent sensor and adapted to be tripped by said sensor in response to a sensed overcurrent;*

*a movable carrier coupled to said latch mechanism and a movable contact carried by said carrier and movable between closed and open positions into and out of contact with said stationary contact in response to movement of said carrier;*

*an overcenter spring coupled to said movable contact for opening and closing said contacts with a snap action; and*

*a frame located in said insulated housing and having a unitary structure, including;*

*a central strap having an outwardly bent tab at one end for mounting said overcurrent sensor, and*

*a pair of substantially aligned side plates integral with and extending from opposite lateral sides of said strap, said side plates having first aligned openings for receiving spring mounting means for securing said overcenter spring to said frame and second aligned openings for receiving said movable carrier for pivotal movement of said carrier between said first and second positions.*

*42. The circuit breaker according to claim 41, wherein said overcurrent sensor includes an overcurrent trip coil mounted to said outwardly bent tab of said frame and an armature pivotably mounted to a pivot mounting means received in third aligned openings of said frame side plates.*

*43. The circuit breaker according to claim 42, further comprising handle link means coupled to said latch mechanism for manually moving said movable contact between closed and open positions; said frame side plates having fourth aligned openings for receiving a pivot mounting means for pivotally mounting said handle link means.*

* * * * *